United States Patent [19]
Yamamoto et al.

[11] Patent Number: 5,822,134
[45] Date of Patent: Oct. 13, 1998

[54] OPTICAL LENS AND MOLD FOR MOLDING THE SAME

[75] Inventors: Kiyoshi Yamamoto, Yokohama; Takeshi Nomura, Tokyo; Masaki Ohmori; Masashi Mashige, both of Kawasaki, all of Japan

[73] Assignee: Canon Kabushiki Kaisha, Tokyo, Japan

[21] Appl. No.: 756,697

[22] Filed: Nov. 26, 1996

Related U.S. Application Data

[63] Continuation of Ser. No. 248,491, May 24, 1994, abandoned.

[30] Foreign Application Priority Data

May 26, 1993 [JP] Japan .................................. 5-124234
May 9, 1994 [JP] Japan .................................. 6-094636

[51] Int. Cl.⁶ .................................................. G02B 3/02
[52] U.S. Cl. .......................................................... 359/718
[58] Field of Search .............................. 425/808; 65/66; D16/134, 101, 300

[56] References Cited

U.S. PATENT DOCUMENTS

| | | | |
|---|---|---|---|
| 3,202,046 | 8/1965 | Roos | 351/159 |
| 4,279,480 | 7/1981 | Bettiol et al. | 351/159 |
| 4,698,089 | 10/1987 | Matsuzaka et al. | 65/290 |
| 4,756,737 | 7/1988 | Yoshimura et al. | 65/275 |
| 5,188,650 | 2/1993 | Nomura | 65/64 |
| 5,191,324 | 3/1993 | Rydel | 359/711 |
| 5,227,917 | 7/1993 | Kubo et al. | 359/642 |
| 5,250,099 | 10/1993 | Kubo et al. | 65/102 |
| 5,275,637 | 1/1994 | Sato et al. | 65/66 |
| 5,365,377 | 11/1994 | Sato | 359/718 |
| 5,435,818 | 7/1995 | Mashige et al. | 65/29.12 |

FOREIGN PATENT DOCUMENTS

| | | |
|---|---|---|
| 59-116137 | 7/1984 | Japan . |
| 59-121124 | 7/1984 | Japan . |
| 59-121126 | 7/1984 | Japan . |
| 59-123629 | 7/1984 | Japan . |
| 60-118642 | 6/1985 | Japan . |
| 4113307 | 4/1992 | Japan ....... 359/711 |

*Primary Examiner*—David C. Nelms
*Assistant Examiner*—Dawn-Marie Bey
*Attorney, Agent, or Firm*—Fitzpatrick, Cella, Harper & Scinto

[57] ABSTRACT

An optical lens press-molded so that within at least the optically effective diameter thereof, the thickness thereof may become greater from the center of the optical axis thereof toward the marginal portion of the lens, characterized in that at least one of the both lens surfaces thereof is a spherical or aspherical concave lens continuous from a transferred surface formed so that in the area outside the optically effective diameter thereof, the thickness of the lens may be limited away from the extension of a curved surface of a radius of curvature setting the optically effective diameter toward the outer diameter of the lens, and forming the transferred surface up to at least the required outer diameter of the lens, and a free surface portion is left outside the outer diameter of the lens during molding.

3 Claims, 8 Drawing Sheets

OPTICAL LENS AND MOLD FOR MOLDING THE SAME

This application is a continuation of application No. Ser. 08/248,491 filed May 24, 1994, now abandoned.

BACKGROUND OF THE INVENTION

1. Field of the Invention

This invention relates to an optical lens press-molded so that within at least the optically effective diameter thereof, the thickness thereof may become greater from the center of the optical axis thereof toward the marginal portion of the lens, for example, an optical lens having a spherical or aspherical concave lens surface, such as a concave lens, a meniscus lens or a toric lens, and to a mold for molding the same.

2. Related Background Art

In recent years, there has been adopted a system in which by the use of upper and lower mold members having a molding surfaces formed with predetermined surface accuracy, a glass blank, for example, a glass blank pre-molded into a certain degree of shape and surface accuracy, is contained between those molding surfaces to thereby press-mold an optical lens under-heating. Thereby, it is contrived to make post-working such as grinding and polishing unnecessary and to improve the productivity of optical elements during the manufacture thereof.

Many methods of manufacturing optical elements as described above are disclosed in considerable number of patent publications, but almost all of them are concerned with the molding of convex lenses, and regarding concave lenses, an embodiment thereof is only disclosed in Japanese Laid-Open Patent Application No. 59-116137, Japanese Laid-Open Patent Application No. 59-121124, Japanese Laid-Open Patent Application No. 59-121126, Japanese Laid-Open Patent Application No. 59-123629 and Japanese Laid-Open Patent Application No. 60-118642.

The optical lenses disclosed in these publications are of simple concave lens shape or are molded with an escape portion for surplus glass left outside the optical effective diameter thereof, and in these publications, there is no description as to how the partial shape of the optical lens in the outside of the above-mentioned optical effective diameter affects the quality of the lens.

Generally, a problem in the molding of a concave lens is that the shape transferability of the optically functioning surface thereof is bad. Conceivable factors which govern that shape transferability are pressing pressure, temperature, cooling condition, mold material, glass material, etc., but besides these, the shape of the cavity of the mold, particularly the shape of the portion outside the optical effective diameter which constitutes the optically functioning surface, is greatly influential.

Usually, to transfer the shape of the cavities in the upper and lower mold members of a mold for molding to an optical lens blank, it is necessary that during press molding, the glass and the molding surfaces of the mold members be reliably in contact with each other. A concave lens is such that as a feature of its shape, the thickness of the lens becomes gradually greater from the center of the optical axis thereof toward the outer periphery thereof and therefore, in the press molding process, pressure applied to the mold for molding is dispersed and it is difficult for this pressure to be transmitted to the outer peripheral portion of the optical lens blank.

Therefore, near the required outer diameter of the optical lens, the optical lens blank and the molding surfaces of the mold do not contact with each other, and the shape transfer within a necessary range (at least within the required outer diameter of the optical lens to be molded) is impossible, or even if tentative shape transfer to the optical lens blank is brought about by the contact of the optical lens blank with the molding surfaces, the transfer pressure within the necessary range will not be secured sufficiently and shape transfer of required accuracy will not be done even within the optical effective diameter.

In order to cope with this, there is a method of pressing down the outer peripheral portion of a molded article by the inner peripheral portion of a drum mold surrounding upper and lower mold members to thereby regulate the outer diameter of the lens and secure the transfer pressure of the outer peripheral portion thereof, but in this case, glass comes into the sliding gap between the upper and lower mold members and the drum mold, and this leads to the adverse effect that when the molded optical lens is taken out of the mold, a part thereof breaks and broken pieces resulting therefrom injure the molding surfaces to thereby shorten the life of the mold.

SUMMARY OF THE INVENTION

The present invention has been made in view of the above-noted circumstances and the object thereof is to provide an optical lens in which sufficient shape transferability within a necessary range is secured when the optical lens is to be obtained by directly press molding without post-processing such as polishing being done, and to provide a mold for molding the optical lens which can display such shape transferability and moreover is free of burrs in the molded article and in which any partial injury is avoided and the inconvenience of injuring the molding surfaces of mold members is avoided.

To achieve the above object, according to the present invention, an optical lens press-molded so that at least within the optically effective diameter thereof, the thickness thereof may become greater from the center of the optical axis thereof toward the marginal portion of the lens is characterized in that at least one of the two lens surfaces thereof is a spherical or aspherical concave lens surface which is continuous from a transferred surface formed so that in the area outside the optically effective diameter thereof, the thickness of the lens may be limited away from the extension of a curved surface of a radius of curvature setting the optically effective diameter toward the outer diameter of the lens and forms said transferred surface up to at least the required outer diameter of the lens, and a free surface portion is left outside said outer diameter of the lens during molding.

Also, a mold for molding the optical lens of the present invention comprises an upper mold member and a lower mold member having their molding surfaces opposed to each other, and is characterized in that the molding surface of at least one of the mold members is comprised of a first transfer surface corresponding to a curved surface of a radius of curvature setting the optically effective diameter of the spherical or aspherical concave lens surface of the optical lens molded by the two mold members, and a second transfer surface formed so that in the transfer area outside said optically effective diameter, the thickness of the lens may be limited away from the extension of said curved surface toward the outer diameter of the lens, continuous from the first transfer surface and formed up to at least the required outer diameter of the lens, the shape of the second transfer surface is set such that in the press-molded state, the outer peripheral portion of the blank of said optical lens forms a free surface portion at a location beyond the second transfer surface, and a required clearance is provided on the outer peripheral side of said molding surface.

Accordingly, in the present invention, shape transferability of high accuracy is secured up to the required area (at least the predetermined outer diameter of the lens) outside the optically effective diameter of the optical lens, and an optical lens having an excellent concave lens surface is obtained. Also, in the mold for molding such optical lens, such regulation that gives transfer pressure to the blank of the optical lens is done by the second transfer surface during press molding and accordingly, sufficient shape transfer ability is displayed and moreover, the creation of burrs is avoided and therefore, when the molded article is to be taken out of the mold, there is no partial damage to the optical lens and there is no possibility of injuring the molding surfaces of the mold members and thus, the life of the mold can be kept long.

DESCRIPTION OF THE PREFERRED EMBODIMENTS

Figure 1:
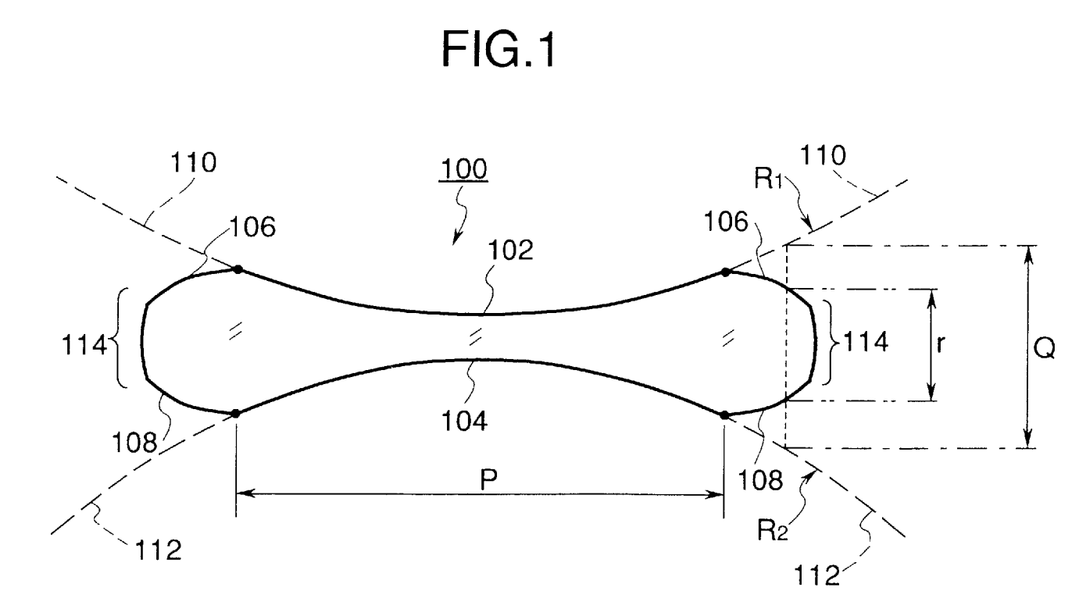
FIG. 1 is a longitudinal cross-sectional side view showing an embodiment of the optical lens of the present invention.

Some embodiments of the present invention will hereinafter be described in detail with reference to the drawings. In FIG. 1, an optical lens 100 made of glass according to the present invention is specifically shown with respect to the cross-sectional shape thereof. The optical lens 100 is one press-molded so that the thickness thereof may become greater from the center of the optical axis thereof toward the marginal portion of the lens, and in this embodiment, it is a concave lens formed with two concave lens surfaces 102 and 104 having an optically effective diameter P about the optical axis thereof.

The concave lens surfaces 102 and 104 are spherical (or aspherical) concave lens surfaces continuous from transferred surfaces 106 and 108 formed so that in the area outside the optically effective diameter P, the thickness of the lens may be limited away from the extension of a curved surface of a radius of curvature setting the optically effective diameter P toward the outer diameter of the lens, and forming the transferred surfaces 106 and 108 up to at least the required outer diameter of the lens, and outside the outer diameter of the lens, free surface portions 114 are left during molding. That is, the shapes of the transferred surfaces 106 and 108 are designed such that at least the spacing r at a location outside the outer diameter of the lens is smaller than the spacing Q between the extensions 110 and 112 of curved surfaces of a radius of curvature forming the concave lens surfaces 102 and 104. For this reason, in the present invention, the transferred surfaces 106 and 108 in the area outside the optically effective diameter P are comprised of flat surfaces or curved surfaces smoothly continuous from curved surfaces of a radius of curvature setting the optically effective diameter P, or a combination thereof.

Figure 2:
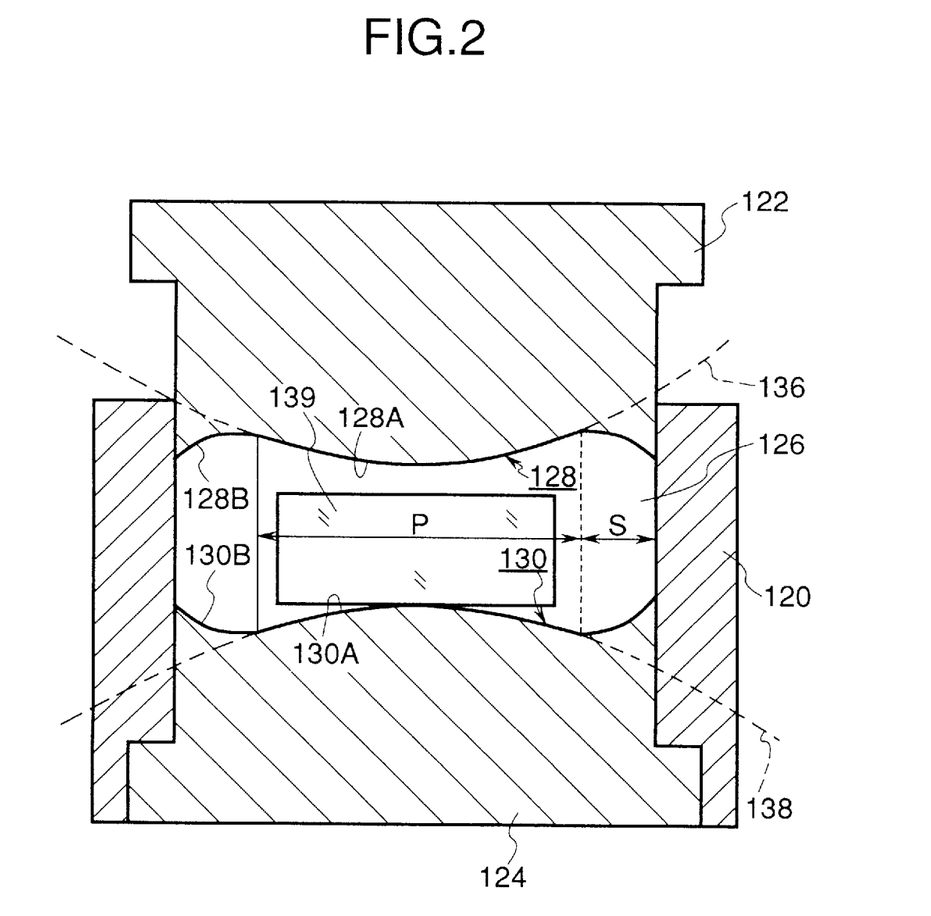
FIG. 2 is a longitudinal cross-sectional side view showing an embodiment of a mold according to the present invention for molding the optical lens of FIG. 1.

FIG. 2 shows an embodiment of a mold for molding the concave lens of the above-described embodiment. In FIG. 2, an upper mold member 122 and a lower mold member 124 are fitted in a drum mold 120 so as to be vertically slidable, and a cavity 126 can be formed by molding surfaces 128 and 130 opposed to each other. These molding surfaces 128 and 130 are provided with first transfer surfaces 128A and 130A and second transfer surfaces 128B and 130B for forming the optically functioning surface (including the above-described optically effective diameter P and transferred surfaces 106, 108) of an optical lens to be molded.

The first transfer surfaces 128A and 130A correspond to curved surfaces 136 and 138 of a radius of curvature setting the optically effective diameter P of the concave lens surface, and the second transfer surfaces 128B and 130B are smoothly continuous from the first transfer surfaces as by arcs as shown so that in the transfer area outside the optically effective diameter P, the thickness of the lens may be limited away from the extensions of said curved surfaces toward the outer diameter of the lens, and are formed up to at least the required outer diameter of the lens (in the present embodiment, beyond it).

Figure 4:
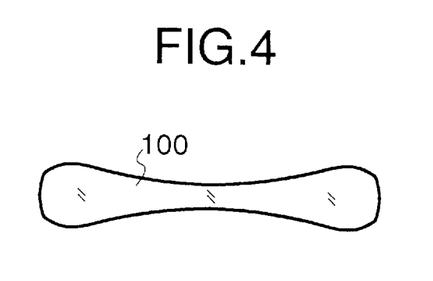
FIG. 4 is a cross-sectional side view of a molded article.
Figure 5:
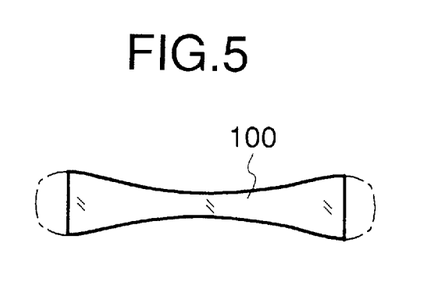
FIG. 5 is a longitudinal cross-sectional side view showing the optical lens when centering and edging have been done.

As a result, in a press molding state (see FIG. 3), the outer peripheral portion of the blank (glass gob) 139 of the optical lens has its movement regulated by the second transfer surfaces 128B and 130B so as to form free surface portions 114 at locations beyond the second transfer surfaces 128B and 130B. Therefore, in this mold, required transfer pressure is secured in the transfer area (from the center of the optical axis to a location beyond at least the outer diameter of the lens). Moreover, in this case, a required clearance S is provided on the outer peripheral side of the aforementioned molding surfaces, whereby even when press molding is completed, there is no possibility of the glass blank 139 coming into the sliding gap between the upper and lower mold members and the drum mold to form so-called burrs. The optical lens 100 formed in this manner is used intactly or with the marginal portion thereof cut from the state of FIG. 4 to the state of FIG. 5 in accordance with the outer diameter of the lens.

Figure 3:
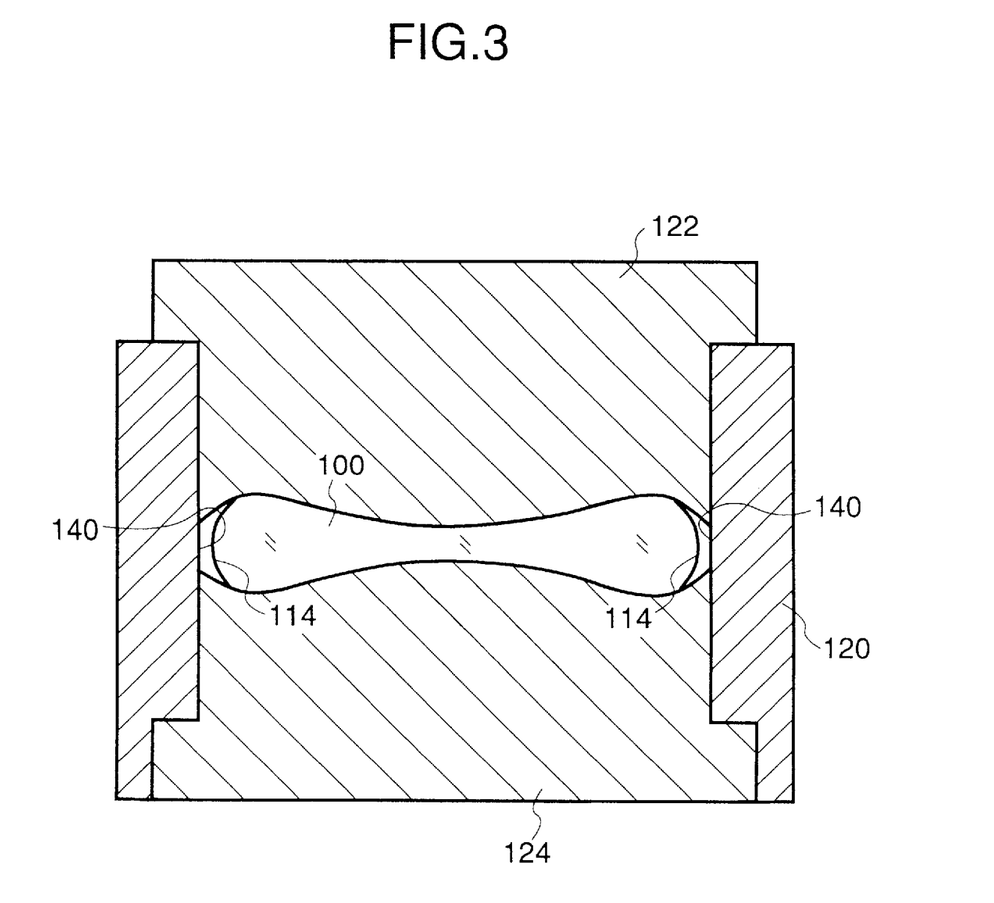
FIG. 3 is a longitudinal cross-sectional view showing the state when the molding by the mold of FIG. 2 has been completed.

The clearance S is set to such a degree of size that when in the press molding state by the upper mold member 122 and the lower mold member 124, the outer peripheral portion of the glass blank 139 moves toward the inner peripheral surface 140 of the drum mold 120, the glass blank 139 does not come into the sliding gap between the upper and lower mold members and the drum mold, and may preferably be set to such a degree that as shown in FIG. 3, for example, the free surface portions of the glass blank 139 do not contact with the inner peripheral surface 140.

(Embodiment 1)

A mode of practice based on specific numerical values will now be described in detail with respect to the above-described embodiment of the present invention. Here, as the glass blank for forming the optical lens, use is made of SK12 ($n_d$=1.58313, $v_d$=59.4, Tg=550° C., At=588° C.), and this is worked in advance into a disc-like shape having an outer diameter of φ18 mm and a thickness of 9.2 mm. An optical lens as described above having a radius of curvature $R_1$=$R_2$= 30 mm, an optically effective diameter P=φ20 mm and a center thickness=2 mm and the both surfaces of which are concave is molded from this glass blank.

The mold for molding this optical lens has the molding surface 128 of its upper mold member 122 and the molding surface 130 of its lower mold member 124 worked into mirror surfaces, and those molding surfaces are of a convex shape in which the portion of a diameter=φ20 mm about the optical axis is at least the area corresponding to the optically effective diameter P of the optical lens 100, i.e., the first transfer surfaces 128A and 130A and the radius of curvature R≈30 mm. Also, the area outside the optically effective diameter to the area of an outer diameter=φ30 mm, i.e., the second transfer surfaces 128B and 130B, are formed by toric surfaces of a shorter radius R=4.5 so that the thickness of the lens may be limited away from the extension of curved surfaces of a curvature forming the first transfer surfaces toward the outer diameter of the lens, and are smoothly continuous.

Thus, the mold is heated to e.g. 630° C. by suitable heating means (not shown) with the glass blank 139 placed on the molding surface 130 of the lower mold member 124, as shown in FIG. 2, and after the glass blank sufficiently rises in temperature, the upper mold member 122 is lowered to thereby effect press molding. FIG. 3 shows the state in which press molding has been completed as described above, and here, the cooling of the mold members is continued until the temperature of the mold falls to 550° C. (Tg). Thereafter, the upper mold member 122 is raised and the optical lens molded into the shape shown in FIG. 2 is taken out.

Therefore, in this mold, required transfer pressure is secured in the transfer area thereof (from the center of the optical axis to at least a location beyond the outer diameter of the lens). Moreover, in this case, a required clearance is provided on the outer peripheral side of the above-described molding surfaces, whereby even when press molding has been completed, there is no possibility of the glass blank coming into the sliding gap between the upper and lower mold members and the drum mold to form so-called burrs.

Figure 6:
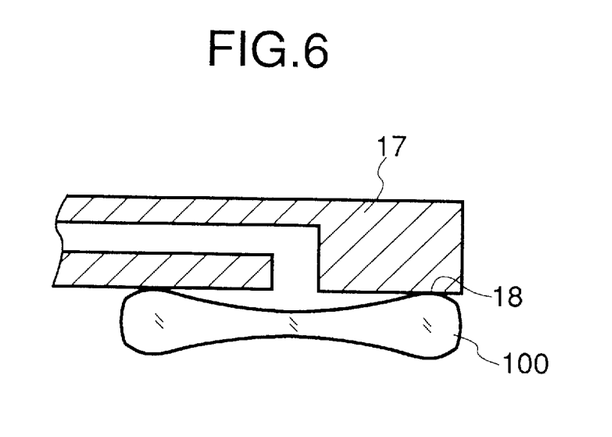
FIG. 6 is a schematic longitudinal cross-sectional side view of a vacuum adsorbing mechanism for taking out the molded article.

The optical lens 100 molded in this manner was of a good quality in which the outer diameter=φ26 mm, the center thickness=2 mm and the accuracy of the optically functioning surface in the area of the optically effective diameter was N : 2 and contour map of the surface: 0.5. Particularly, the transferred surface 106 outside the optically effective diameter R is sufficient in the transferability during molding and molded highly accurately and therefore, when it is adsorbed by a vacuum adsorbing mechanism 17 having a flat adsorbing surface as shown in FIG. 6 when the molded optical lens 100 is taken out of the mold, the airtightness between the contact portion 18 thereof and the above-mentioned adsorbing surface is good and the work of taking out the optical lens can be done reliably.

(Embodiment 2)

A second embodiment of the present invention will now be specifically and numerically described with reference to FIG. 7. As a glass blank for forming an optical lens, SK12 is used as in Embodiment 1, and this is worked in advance into a disc-like shape having an outer diameter of φ18 mm and a thickness of 7.65 mm. As in Embodiment 1, an optical lens 200 having a radius of curvature $R_1$=$R_2$=30 mm, an optically effective diameter P=φ20 mm and a center thickness=2 mm and the both surfaces of which are concave is molded from this glass blank.

Figure 7:
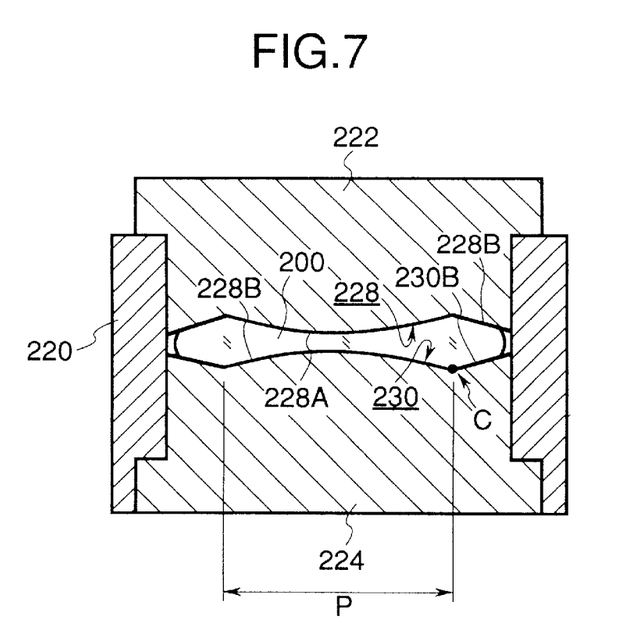
FIG. 7 is a longitudinal cross-sectional side view showing a second embodiment of the mold of the present invention.

A mold used here is comprised of an upper mold member 222 and a lower mold member 224, and a drum mold 220 in which these are slidably fitted as shown in FIG. 7, and the molding surfaces 228 and 230 of the respective mold members are finished into mirror surfaces. Each molding surface is of a convex shape having a radius of curvature R≈30 with the portion of φ20 mm from the center of the optical axis as the area 228A, 230A of the optically effective diameter. Also, transfer areas 228B and 230B extending from the outside of the optically effective diameter P=φ20 mm to at least the lens outer diameter=φ30 mm are formed by a conical surface having a vertical angle 120°, and outside the optically effective diameter P, there is formed a circumscribed circle of a small diameter which smoothly links the two together (in FIG. 7, the circumscribed circle is omitted to make the portion of continuation with the conical surface clear, and that portion is indicated by C).

The mold is heated to 630° C. by suitable heating means with the disc-shaped glass blank placed on the molding surface 230 of the lower mold member 224, and after the glass blank sufficiently rises in temperature, the upper mold member 222 is lowered to thereby effect press molding. In the state shown in FIG. 7, the cooling of the mold is continued until the temperature of the mold falls to 550° C. (Tg), whereafter the upper mold member is raised and the molded optical lens 200 is taken out.

Therefore, in this mold, required transfer pressure is secured in the transfer area thereof (from the center of the optical axis to at least a location beyond the outer diameter of the lens). Moreover, in this case, a required clearance is provided on the outer peripheral side of the above-mentioned molding surface, whereby even when press molding has been completed, there is no possibility of the glass blank coming into the sliding gap between the upper and lower mold members and the drum mold to form so-called burrs. The optical lens 200 molded in this manner was of a good quality in which the outer diameter=φ26 mm, the center thickness=2 mm and the surface accuracy of the transfer surface was N: 2 and contour map of the surface: 0.5.

(Embodiment 3)

In this embodiment, there is adopted a preparatory molding system in which Lak12 ($n_d$=1.67790, $v_d$=55.3, Tg=554° C., At=596° C.) is molten as a glass blank for forming an optical lens and a predetermined quantity of it is flowed out into a receiving mold to thereby obtain a glass blank (glass gob) and by the use of it, an optical lens is molded. The optical lens molded here is a concave meniscus lens in which the radius of curvature of the concave surface side is $R_1$=30 mm, the radius of curvature of the convex surface side is $R_2$=80 mm, the optically effective diameter P=φ20 mm and the center thickness=2 mm.

(Third Embodiment)

Figure 8:
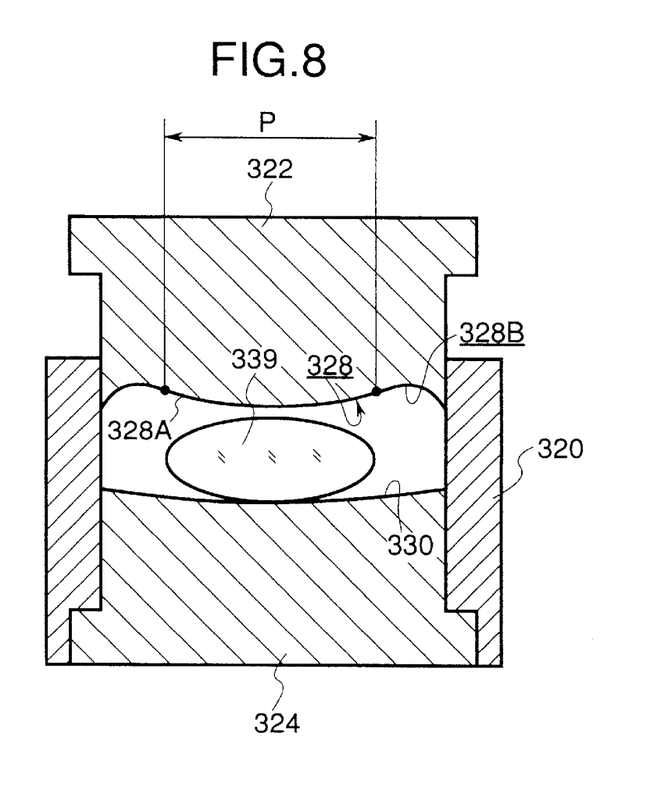
FIG. 8 is a longitudinal cross-sectional side view showing a third embodiment of the mold of the present invention.
Figure 9:
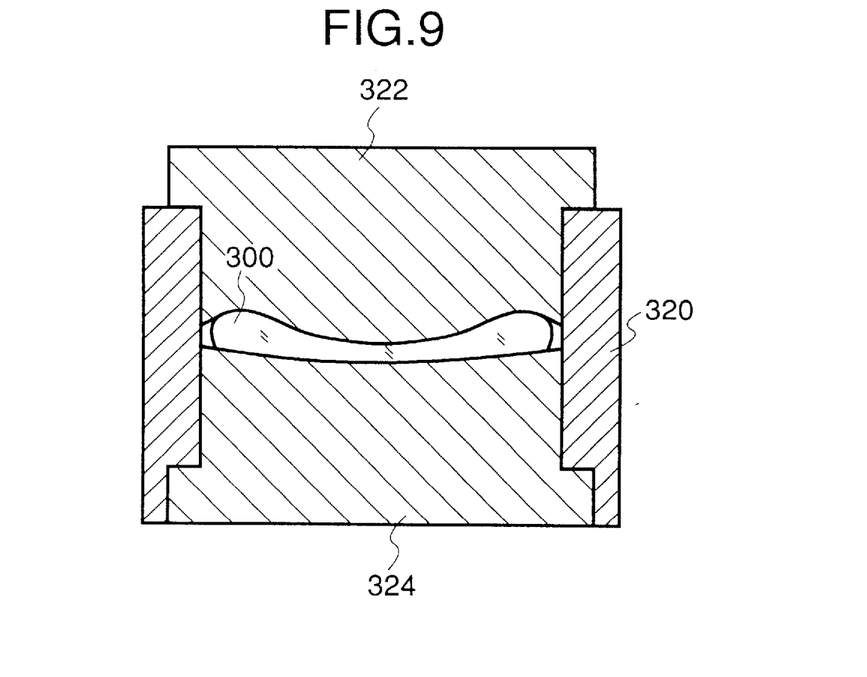
FIG. 9 is a longitudinal cross-sectional side view showing the state when the molding by the third embodiment has been completed.

FIGS. 8 and 9 show a mold according to a third embodiment of the present invention for molding an optical lens from the above-described glass blank. In this embodiment, the mold is comprised of an upper mold member 322, a lower mold member 324 and a drum mold 320, and a glass blank 339 is placed on the molding surface of the lower mold member 324. The molding surface 328 of the upper mold member 322, as in the aforedescribed Embodiment 1, is of a convex shape in which the portion of φ20 mm from the center of the optical axis has a radius of curvature R≈30 mm as a transfer area 328A of the optically effective diameter, and a transfer area 328B extending from the outside of the optically effective diameter=φ20 mm to the lens outer diameter=φ30 mm is formed by a concave surface smoothly continuous from the transfer area 328A by a circumscribed arc of a radius R=30 mm. On the other hand, the molding surface 330 of the lower mold member 324 is worked into a concave surface of a radius of curvature R≈80 mm.

Thus, the mold is heated to 620° C. by suitable heating means with the glass blank 339 of a weight 4.95 g placed on the molding surface of the lower mold member 324, as shown in FIG. 8, and after the glass blank 339 sufficiently rises in temperature, the upper mold member 322 is lowered to thereby effect press molding.

FIG. 9 shows a state in which press molding has been completed, and in this state, the mold was cooled down until the temperature of the mold fell to 554° C. (Tg), whereafter the upper mold member 322 was raised and the molded optical lens 300 was taken out. Therefore, in this mold, required transfer pressure is secured in the transfer area thereof (from the center of the optical axis to at least a location beyond the outer diameter of the lens). Moreover, in this case, a required clearance is provided on the outer peripheral side of the above-mentioned molding surface, whereby even when press molding has been completed, there is no possibility of the glass blank coming into the sliding gap between the upper and lower mold members and the drum mold to form so-called burrs. The optical lens 300 molded in this manner was of a good quality in which the outer diameter=φ26 mm, the center thickness=2 mm and the accuracy of the transfer surface within the optically effective diameter was N: 3 and contour map of the surface: 0.5.

(Embodiment 4)

Figure 10:
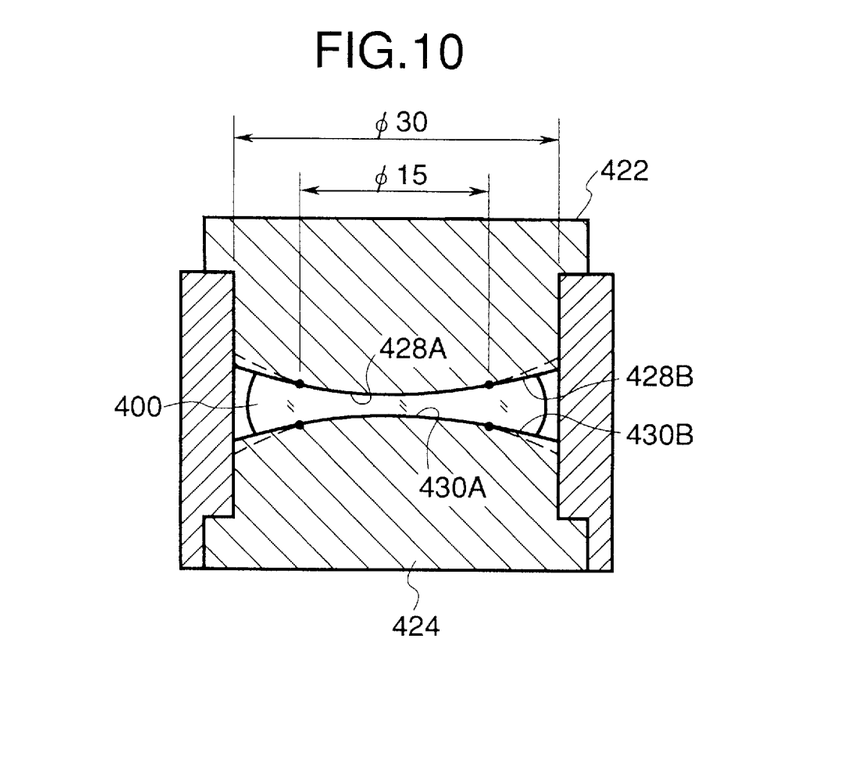
FIG. 10 is a longitudinal cross-sectional side view showing a fourth embodiment of the present invention.

In a fourth embodiment shown in FIG. 10, upper and lower mold members 422 and 424 are provided with molding surfaces in which first transfer surfaces 428A, 430A in which both surfaces of an optically effective diameter P=φ15 mm are convexly curved surfaces of a radius of curvature R=35 mm and second transfer surfaces 428B, 430B therefrom to a diameter=φ30 mm larger than the outer diameter are smoothly continuous to each other, and the second transfer surfaces each are a toric surface of a shorter radius R=200. Therefore, in this mold, required transfer pressure is secured in the transfer area thereof (from the center of the optical axis to at least a location beyond the outer diameter of the lens). Moreover, in this case, a required clearance is provided on the outer peripheral side of the above-mentioned molding surface, whereby even when press molding has been completed, there is no possibility of the glass blank coming into the sliding gap between the upper and lower mold members and the drum mold to form so-called burrs. The optical lens (biconcave lens) 400 molded by such a mold has a free surface portion on the outer periphery thereof immediately after the molding.

(Embodiment 5)

Figure 11:
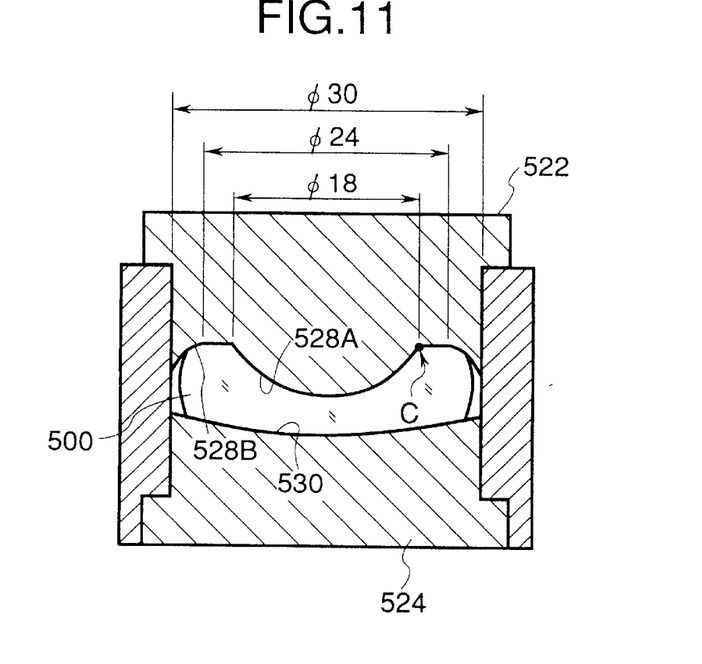
FIG. 11 is a longitudinal cross-sectional view showing a fifth embodiment of the present invention.

In a fifth embodiment shown in FIG. 11, an upper mold member 522 is provided with a molding surface in which a convexly curved first transfer surface 528A in which an area of an optically effective diameter P=φ18 mm is a convexly curved surface of a radius of curvature R=10 mm and a second transfer surface 528B therefrom to a diameter=φ30 mm larger than the outer diameter of the lens are smoothly continuous to each other as by a circumscribed arc of a small diameter (in FIG. 11, only the location thereof being indicated by a point C), and a second transfer surface is such that the portion thereof from the outside of the optically effective diameter to a diameter=φ24 mm is formed by a flat surface continuous from the above-mentioned circumscribed arc and the portion from the diameter=φ24 mm to a diameter=φ30 mm is formed by a toric surface of a shorter radius R=7. At least the transfer area of the molding surface 530 of a lower mold member 524 is comprised of the concavely curved surface of the optical lens having a required diameter. Therefore, in this mold, required transfer pressure is secured in the transfer area thereof (from the center of the optical axis to at least a location beyond the outer diameter of the lens). Moreover, in this case, a required clearance is provided on the outer peripheral side of the above-mentioned molding surface, whereby even when press molding has been completed, there is no possibility of the glass blank coming into the sliding gap between the upper and lower mold members and the drum mold to form so-called burrs. An optical lens (a lens of which one surface is concave) 500 molded by such a mold has a free surface portion on the outer periphery thereof immediately after the molding.

(Embodiment 6)

Figure 12:
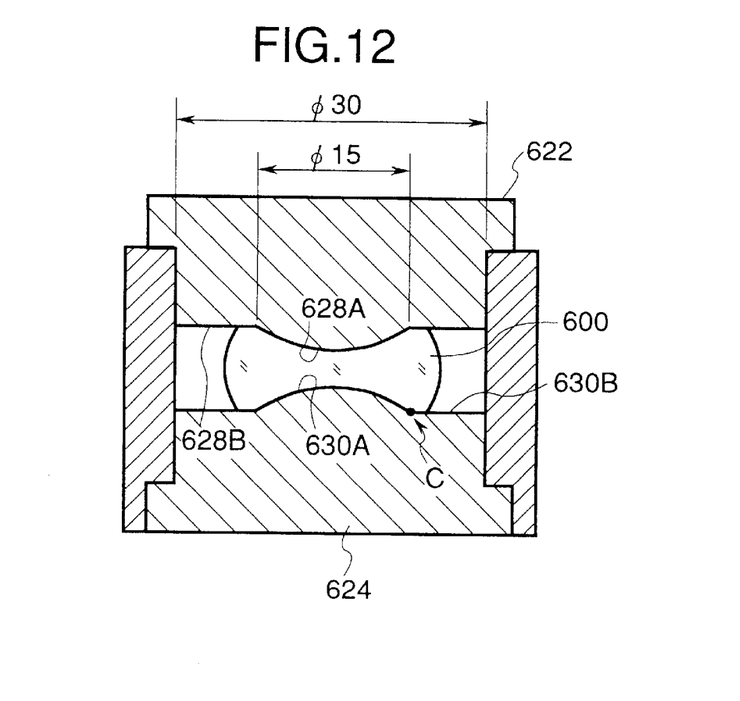
FIG. 12 is a longitudinal cross-sectional view showing a sixth embodiment of the present invention.

In a sixth embodiment shown in FIG. 12, upper and lower mold members 622 and 624 are provided with molding surfaces in which first transfer surfaces 628A, 630A in which both surfaces of an optically effective diameter P=φ15 mm are convexly curved surfaces of a radius of curvature R=15 mm and second transfer surfaces 628B, 630B therefrom to a diameter =φ30 mm larger than the outer diameter of the lens are smoothly continuous to each other, and the second transfer surfaces are flat surfaces continuous from the first transfer surfaces through a circumscribed arc of a small diameter (not shown). Therefore, in this mold, required transfer pressure is secured in the transfer area thereof (from the center of the optical axis to at least a location beyond the outer diameter of the lens). Moreover, in this case, a required clearance is provided on the outer peripheral side of the above-described molding surfaces, whereby even when press molding has been completed, there is no possibility of the glass blank coming into the sliding gap between the upper and lower mold members and the drum mold to form so-called burrs. An optical lens (a lens of which the both surfaces are concave) 600 molded by such a mold has a free surface portion on the outer periphery thereof immediately after the molding.

(Embodiment 7)

Figure 13:
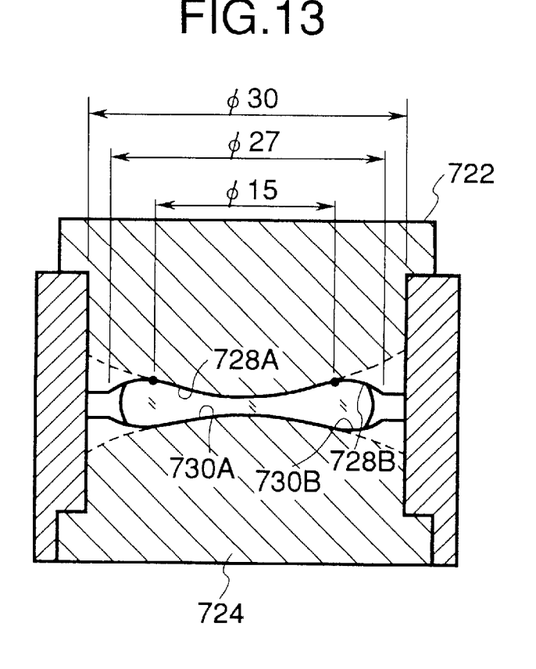
FIG. 13 is a longitudinal cross-sectional side view showing a seventh embodiment of the present invention.

In a seventh embodiment shown in FIG. 13, upper and lower mold members 722 and 724 are provided with molding surfaces in which first transfer surfaces 728A, 730A in which both surfaces of an optically effective diameter P=φ15 mm are convexly curved surfaces of a radius of curvature R=30 mm and second transfer surfaces 728B, 730B of a diameter=φ30 mm larger than the outer diameter of the lens are smoothly continuous to each other, and the second transfer surfaces are such that the portion thereof from the outside of the optically effective diameter to a diameter=φ27 mm is formed by a toric surface of a shorter radius R=10 circumscribed to the transfer surface 728A and the portion thereof from the diameter =φ27 mm to a diameter=φ30 mm is formed by a flat surface continuous from the toric surface through a circumscribed arc of a small diameter (in FIG. 13, the location thereof being indicated by C). Therefore, in this mold, required transfer pressure is secured in the transfer area thereof (from the center of the optical axis to at least a location beyond the outer diameter of the lens). Moreover, in this case, a required clearance is provided on the outer peripheral side of the above-described molding surfaces, whereby even when press molding has been completed, there is no possibility of the glass blank coming into the sliding gap between the upper and lower mold members and the drum mold to form so-called burrs. An optical lens (a lens of which the both surfaces are convex) molded by such a mold has a free surface portion on the outer periphery thereof immediately after the molding.

(Comparative Example 1)

Figure 14:
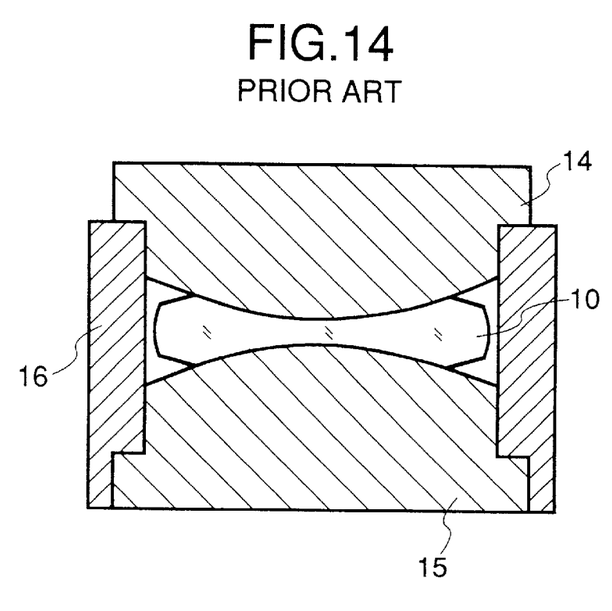
FIG. 14 is an illustration of a lens molding mold according to the prior art.

FIG. 14 shows the manner of molding a prior-art concave lens mentioned as a comparative example in order to make the features of the present invention clear. In FIG. 14, the reference numeral 14 designates an upper mold member having a molding surface formed with a predetermined radius of curvature R≅30, and the reference numeral 15 denotes a lower mold member having the same molding surface as that of the upper mold member, the reference numeral 16 designates a drum mold, and the reference numeral 10 denotes a molded lens. When the optically functioning surfaces are transferred to a glass blank by such simple molding surfaces, the following disadvantages occur. The same material as that in Embodiment 1 is used as the glass blank, and the optically effective diameter of the molded lens 10 is also set to the same as that in Embodiment 1.

Thus, the glass blank was placed on the molding surface of the lower mold member 15, the mold was heated to 630° C. by suitable heating means, and after the glass sufficiently rose in temperature, the upper mold member 14 was lowered to thereby effect press molding. In a state in which press molding was completed, the mold was cooled down until the temperature of the mold fell to 550° C. (Tg), whereafter the upper mold member was raised and the optical lens 10 was taken out. As a result, the optical lens 10 formed an extreme contour map of the surface on the marginal portion thereof and the shapes of the optically functioning surfaces were not sufficiently transferred. Therefore, the accuracy of the transfer surfaces within the optically effective diameter was bad, and when the optical lens was taken out of the mold, adsorption was attempted by the use of the vacuum adsorbing mechanism 17 of FIG. 6 as in Embodiment 1, but the airtightness of the contact portion 18 was bad and adsorption and taking-out were impossible. This is considered to be because even within the required outer diameter of the lens, transfer pressure is not sufficiently applied and therefore the contact portion 18 becomes a free surface portion and does not maintain a predetermined shape.

The shape of the first transfer surface within the optically effective diameter of the optical lens of the present invention may be spherical or aspherical, and the shape of the second transfer surface outside the optically effective diameter may be spherical, toric, conical or the like, but of course, may be other smooth surface shape such as an amorphous continuous surface if it is such a shape that can maintain the transfer pressure to at least the outer diameter of the lens by the viscoelasticity of glass during molding and suppress the movement of the outer peripheral portion of the glass blank within the mold.

According to the present invention, as described above in detail, in an optical lens press-molded so that within at least the optically effective diameter, the thickness may become greater from the center of the optical axis toward the marginal portion of the lens, at least one of the two lens surfaces thereof is a spherical or aspherical concave lens surface continuous from a transferred surface formed so that in the area outside the optically effective diameter thereof, the thickness of the lens may be limited away from the extension of a curved surface of a radius of curvature setting the optically effective diameter toward the outer diameter of the lens, and forming said transferred surface to at least the required outer diameter of the lens, and since a free surface portion is left outside the outer diameter of the lens during molding, sufficient shape transferability within a necessary range can be secured when the optical lens is directly obtained by press molding without any post-treatment such as polishing being done.

Also, the mold of the present invention comprises an upper mold member and a lower mold member having their molding surfaces opposed to each other, and the molding surface of at least one of the mold members is comprised of a first transfer surface corresponding to a curved surface of a radius of curvature setting the optically effective diameter of the spherical or aspherical concave lens surface of an optical lens press-molded by the two mold members, and a second transfer surface formed so that in the transfer area outside said optically effective diameter, the thickness of the lens may be limited away from the extension of said curved surface toward the outer diameter of the lens, continuous from the first transfer surface and formed up to at least the required outer diameter of the lens, and the shape of the second transfer surface is set such that in the press-molded state, the outer peripheral portion of the blank of said optical lens forms a free surface portion at a location beyond the second transfer surface, and a 5 required clearance is provided on the outer peripheral side of said molding surface. Therefore, the shape transferability to the molded blank can be displayed during molding and moreover, the molded article is free of burrs, and partial damage is avoided when the 10 molded article is taken out of the mold and also, it is possible to avoid the inconvenience that the molding surfaces of the mold members are injured.

What is claimed is:

1. An optical lens including two pressed surfaces and a free surface formed by transferring two molds, so that thickness thereof becomes greater from a center of an optical axis thereof toward a marginal portion of said optical lens within at least an optically effective diameter thereof, wherein for each of the two pressed surfaces, (a) inside the optically effective diameter a concave spherically or aspherically curved lens surface is formed, and (b) outside the optically effective diameter a transfer surface away from extension of the curved lens surface so as to restrict the lens thickness and extending up to a required outer diameter is formed, wherein, on each of the pressed surfaces, the curved lens surface joins smoothly to the transfer surface by rounding a joined portion without leaving an edge, and wherein the free surface is left during molding in an area outside the outer diameter of said optical lens.

2. A lens according to claim 1, wherein said lens is constructed as a meniscus lens.

3. A lens according to claim 1, wherein said lens is constructed as a toric lens.

* * * * *

UNITED STATES PATENT AND TRADEMARK OFFICE
CERTIFICATE OF CORRECTION

PATENT NO. : 5,822,134
DATED : October 13, 1998
INVENTOR(S) : Kiyoshi YAMAMOTO, et al.

It is certified that error appears in the above-identified patent and that said Letters Patent is hereby corrected as shown below:

ON THE COVER PAGE:

AT [56] References Cited - FOREIGN PATENT DOCUMENTS:

"4113307" should read --4-113307--.

COLUMN 1:

Line 30, "number" should read --numbers--.

COLUMN 7:

Line 17, "are" should read --arc--.

COLUMN 8:

Line 13, "are" should read --arc--.

UNITED STATES PATENT AND TRADEMARK OFFICE
CERTIFICATE OF CORRECTION

PATENT NO. : 5,822,134

DATED : October 13, 1998

INVENTOR(S) : Kiyoshi YAMAMOTO, et al.

It is certified that error appears in the above-identified patent and that said Letters Patent is hereby corrected as shown below:

<u>COLUMN 10</u>:

```
Line 35, "a 5 required" should read --a required--.
Line 40, "the 10 molded" should read --the molded--.
```

Signed and Sealed this

Twenty-ninth Day of June, 1999

*Attest:*

Q. TODD DICKINSON

*Attesting Officer*   *Acting Commissioner of Patents and Trademarks*